United States Patent
Hong

(10) Patent No.: US 9,360,703 B2
(45) Date of Patent: Jun. 7, 2016

(54) LIQUID CRYSTAL DISPLAY DEVICE

(75) Inventor: Hee-Jung Hong, Seoul (KR)

(73) Assignee: LG DISPLAY CO. LTD., Seoul (KR)

( * ) Notice: Subject to any disclaimer, the term of this patent is extended or adjusted under 35 U.S.C. 154(b) by 1405 days.

(21) Appl. No.: 11/638,210

(22) Filed: Dec. 13, 2006

(65) Prior Publication Data

US 2007/0171353 A1    Jul. 26, 2007

(30) Foreign Application Priority Data

Jan. 20, 2006  (KR) .................. 10-2006-0006321

(51) Int. Cl.
*G02F 1/1335* (2006.01)

(52) U.S. Cl.
CPC .... *G02F 1/133603* (2013.01); *G02F 1/133608* (2013.01); *G02F 2001/133628* (2013.01)

(58) Field of Classification Search
CPC ............... G02F 1/133382; G02F 1/133385; G02F 1/33308; G02F 1/133314; G02F 1/133608; G02F 2001/133628; G02F 1/133603; G02F 1/133615
USPC .......................................................... 349/161
See application file for complete search history.

(56) References Cited

U.S. PATENT DOCUMENTS

| | | | |
|---|---|---|---|
| 7,064,952 B1 * | 6/2006 | Chen et al. | 361/679.01 |
| 7,101,055 B2 * | 9/2006 | Hsieh et al. | 362/29 |
| 2002/0001184 A1 * | 1/2002 | Kim | G02B 6/0031 362/633 |
| 2005/0157516 A1 * | 7/2005 | Chen et al. | 362/555 |
| 2005/0275766 A1 * | 12/2005 | Liu et al. | 349/64 |
| 2006/0039132 A1 * | 2/2006 | Chen | 362/97 |
| 2006/0082697 A1 * | 4/2006 | Saitoh et al. | 349/58 |
| 2006/0176416 A1 * | 8/2006 | Ikeda | 349/58 |
| 2006/0292461 A1 * | 12/2006 | Shives | G02F 1/133385 430/7 |
| 2008/0024694 A1 * | 1/2008 | Kondo et al. | 349/58 |

FOREIGN PATENT DOCUMENTS

| | | |
|---|---|---|
| JP | 2005-316337 | 11/2005 |
| KR | 1995-0003162 | 4/1995 |
| KR | 1020030089654 A | 11/2003 |

OTHER PUBLICATIONS

Office Action issued in corresponding Korean Patent Application No. 10-2006-0006321, mailed Jun. 19, 2012.

* cited by examiner

*Primary Examiner* — Jessica M Merlin
(74) *Attorney, Agent, or Firm* — Brinks Gilson & Lione

(57) ABSTRACT

A liquid crystal display (LCD) device includes a backlight assembly with a light source between a liquid crystal panel and a bottom. A heat sink is disposed on the bottom case to irradiate heat out of the liquid crystal display device. The heat sink may be located where the heat is accumulated by thermal convection, or near the top of the LCD device.

17 Claims, 5 Drawing Sheets

LIQUID CRYSTAL DISPLAY DEVICE

The present invention claims the benefit of Korean Patent Application No. 2006-006321, filed in Korea on Jan. 20, 2006, which is hereby incorporated by reference.

TECHNICAL FIELD

The present application relates to a liquid crystal display device.

BACKGROUND

Display devices have traditionally used cathode-ray tubes (CRT). Presently, much effort has been made to study and develop various types of flat panel displays, such as liquid crystal display (LCD) devices, plasma display panels (PDP), field emission displays, and electro-luminescence displays (ELD), as a substitute for CRT displays. LCD devices have certain advantages over the other displays, such as high resolution, light weight, thin profile, compact size, and low power supply requirements.

Generally, an LCD device includes two substrates that are spaced apart and face one another with a liquid crystal material disposed between the two substrates. The two substrates include electrodes that face each other. A voltage applied between the electrodes induces an electric field across the liquid crystal material. Alignment of the liquid crystal molecules in the liquid crystal material changes in accordance with the intensity of the induced electric field, thereby changing the light transmissivity of the LCD device. Thus, the LCD device displays images by varying the intensity of the induced electric field.

Because the LCD device is a non-emissive type display device, a backlight is needed to supply the non-emissive type display device with light. A CCFL (cold cathode fluorescent lamp) or an EEFL (external electrode fluorescent lamp) may be used. Recently, a LED (light emitting diode) has been used because of it's small size, low power consumption and high reliability.

FIG. 1 is an exploded perspective view illustrating an LCD device using an LED according to the related art. In the related art LCD module as shown in FIG. 1, a backlight assembly 20 and a liquid crystal panel 10 are sequentially disposed over a bottom case 50. A main supporter 40 has a rectangular frame shape and supports the backlight assembly 20 and the liquid crystal panel 10. The main supporter 40 may be combined with the bottom case 50.

Gate and source printed circuit board (PCB) 18 and 16 are connected to the liquid crystal panel 10 through a flexible printed circuit (FPC) film. A top cover 60 is disposed on the top of the liquid crystal panel 10. As shown, the top cover 60 has a rectangular frame shape. The top cover 60 presses and fixes a peripheral portion of the liquid crystal panel 10 and is combined with the main supporter 40 and the bottom case 50.

The backlight assembly 20 includes a plurality of LEDs 24, a reflecting sheet 26, a light guide plate 30, and optical sheets 32 such as a prism sheet and/or a diffusion sheet. The LEDs 24 are arranged on a plurality of a base PCBs (metal core printed circuit boards) 22. The base PCBs 22 are arranged in parallel on the bottom case 50. The reflecting sheet 26 has a plurality of through holes 28. The through holes 28 correspond to the LEDs 24. The light guide plate 30 has a plurality of reflecting dots 31. The reflecting dots 31 also correspond to the LEDs 24 or the through holes 28. The optical sheets 32 are spaced apart from the light guide plate 30. The optical sheets 32 condense and diffuse light passing through the light guide plate 30.

A viewer generally watches the LCD device in a standing state, as illustrated in FIG. 2. FIG. 2 is a cross-sectional view taken along a line II-II of FIG. 1. The LCD device of FIG. 2 is shown standing vertically to a ground for viewer's convenience. With respect to the standing LCD device, the gate PCB (18 of FIG. 1) is disposed at a side portion of the LCD device, and a source PCB 16 is disposed at a top portion of the LCD device as shown in FIG. 2. A control PCB 70 having a timing controller is connected to the source PCB 16. The control PCB 70 generates control signals for the gate PCB and the source PCB 16 and supplies data signals to the source PCB 16. The control PCB 70 is disposed at an upper portion of the standing LCD device.

The LEDs 24 consume power to generate light, and thus much heat is produced at the LEDs 24. The LEDs 24 may require a substantial amount of power to generate enough light. The heat is accumulated at the upper portion of the standing LCD device by a thermal convention. Accordingly, liquid crystal molecules at the upper portion of the standing LCD device may become deteriorated and/or abnormally arranged. Further, driving circuits, such as the source PCB 16 and the control PCB 70, at the upper portion of the standing LCD device may be abnormally operated based on the effects from the heat.

To resolve these problems, a heat sink 62 may be attached on a rear surface of the bottom case 50. However, because the heat sink 62 is attached on the rear surface of the bottom, it may be difficult to radiate the heat that is accumulated at the upper portion. Further, because the heat sink 62 has a basic body and a plurality of pins that protrude from the basic body, the LCD device may have an increased thickness due to the presence of the heat sink 62.

SUMMARY

Accordingly, the present disclosure is directed to a liquid crystal display device that substantially obviates one or more of problems due to limitations and disadvantages of the related art. By way of introduction, the display device includes a heat sink located on the device to effectively irradiate heat outside that has accumulated through thermal convection. Accordingly, a heat sink may be positioned near the top of the display device to irradiate the heat that rises and accumulates near the top of the device.

In a first aspect, a liquid crystal display device includes a backlight assembly disposed adjacent a liquid crystal panel and a bottom case. The backlight assembly includes a light source. The device includes a heat sink including a first part and a second part. The first part of the heat sink is disposed adjacent to a top portion of the liquid crystal display device, and the second part is disposed adjacent to an upper portion of the liquid crystal display device.

In a second aspect, a liquid crystal display device includes a backlight assembly disposed between a liquid crystal panel and a bottom case. The backlight assembly includes a light source. The device includes a heat sink configured to irradiate heat produced at the light source. The heat is irradiated outside the liquid crystal display device. A driving circuit is configured to operate the liquid crystal panel. The driving circuit disposed at a lower portion of the liquid crystal display device.

In a third aspect, a liquid crystal display device includes a backlight assembly coupled with a liquid crystal panel and a bottom case. The backlight assembly includes at least one light source. A heat sink is disposed on the liquid crystal display device where heat produced at the light source is accumulated by a thermal convection. A driving circuit is disposed on the liquid crystal display device at a position different from where the heat is accumulated and the heat sink is disposed.

In a fourth aspect, a liquid crystal display device includes a liquid crystal panel and a bottom case coupled with the liquid crystal panel. A backlight assembly is coupled with the liquid crystal panel and the bottom case. The backlight assembly comprises a light source. A heat sink is disposed on an upper portion of the bottom case. The heat sink is coupled with a top of the bottom case and a back of the bottom case.

In a fifth aspect, a liquid crystal display device includes a display panel and a backlight assembly coupled with the display panel. The backlight assembly includes a light source for the display panel. A bottom case is coupled with the backlight assembly. A heat sink is coupled with the bottom case. The heat sink is disposed on an area of the bottom case where thermal convection causes an accumulation of heat. A driving circuit is configured to drive the display panel and disposed on an area of the bottom case opposite from the heat sink.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims and be defined by the following claims. Nothing in this section should be taken as a limitation on those claims. Further aspects and advantages are discussed below in conjunction with the preferred embodiments.

BRIEF DESCRIPTION OF THE DRAWINGS

The system may be better understood with reference to the following drawings and description. Non-limiting and non-exhaustive embodiments are described with reference to the following drawings. The components in the figures are not necessarily to scale, emphasis instead being placed upon illustrating the principles of the invention. In the figures, like referenced numerals designate corresponding parts throughout the different views.

DETAILED DESCRIPTION OF THE PREFERRED EMBODIMENTS

Figure 1:
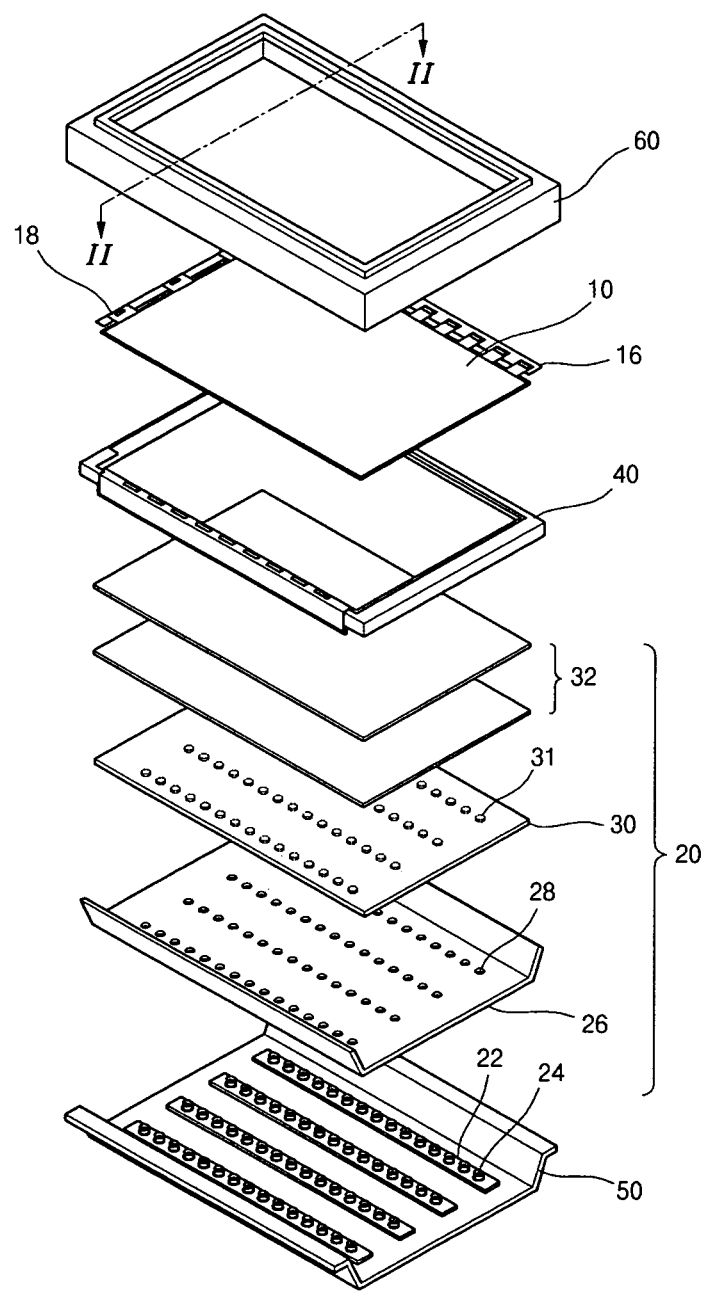
FIG. 1 is an exploded perspective view illustrating an LCD device using an LED according to the related art.
Figure 2:
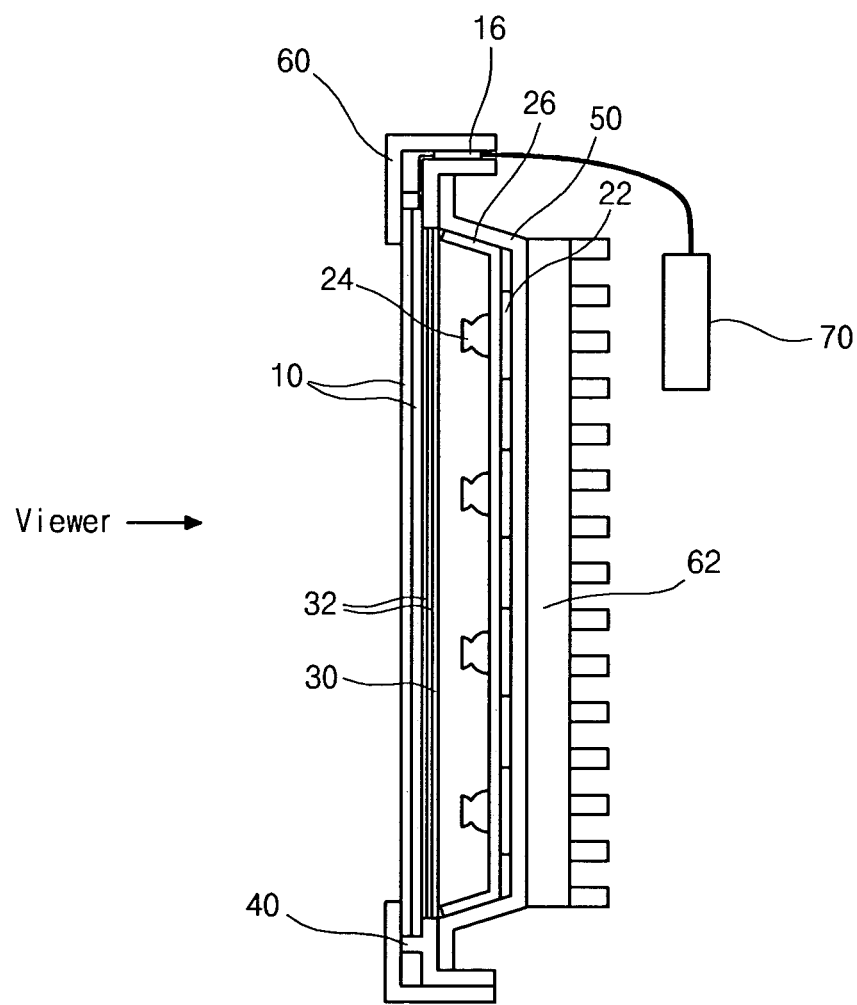
FIG. 2 is a cross-sectional view taken along a line II-II of FIG. 1 according to the related art.
Figure 3:
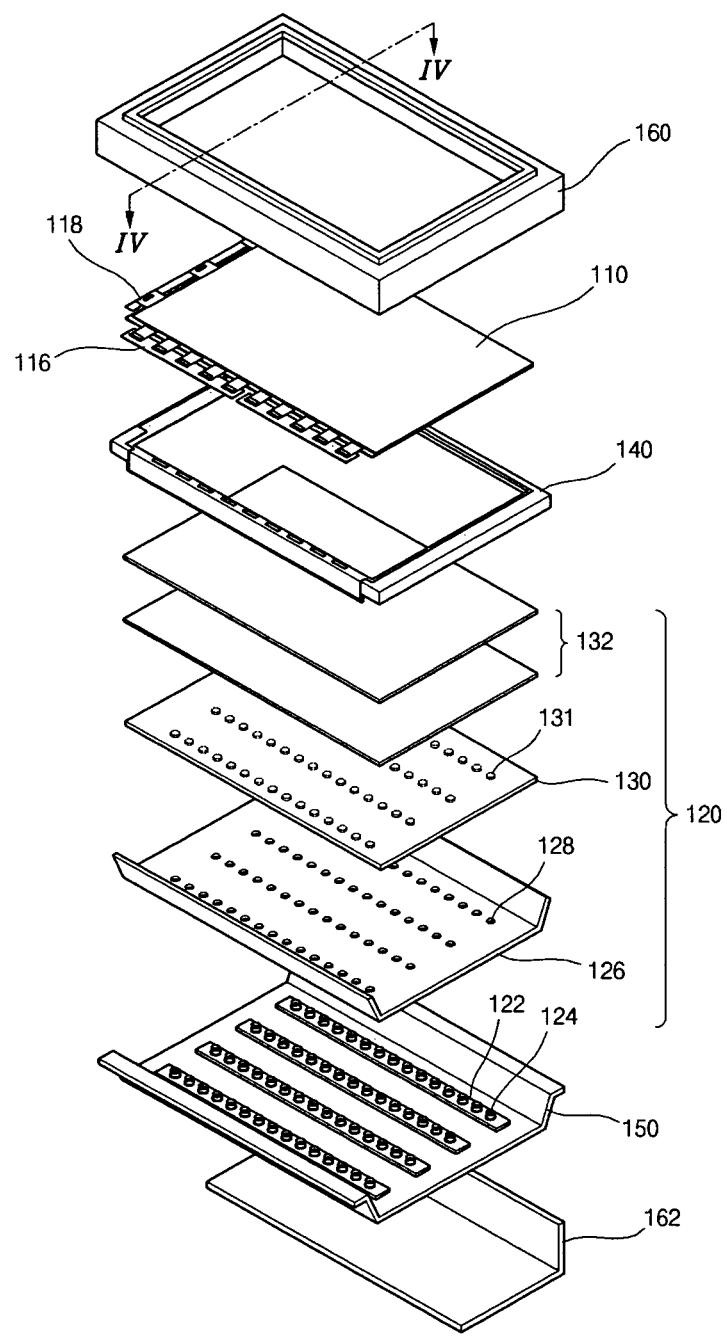
FIG. 3 is an exploded perspective view illustrating an LCD device using an LED according to an exemplary embodiment.

Exemplary embodiments may be better understood with reference to the drawings, but these examples are not intended to be of a limiting nature. FIG. 3 is an exploded perspective view illustrating an LCD device using an LED according to an exemplary embodiment. In the LCD device according to the exemplary embodiment shown in FIG. 3, a backlight assembly 120 and a liquid crystal panel 110 may be disposed over an inner surface of a bottom case 150. A bottom case 150 may be made of metal or other substance having a high thermal conductivity.

A main supporter 140 has a rectangular frame shape and supports the backlight assembly 120 and the liquid crystal panel 110. Alternatively, the main supporter 140 may be in a shape other than a rectangle. The main supporter 140 is coupled with the bottom case 150. Herein, the phrase "coupled with" is defined to mean directly connected to or indirectly connected through one or more intermediate components. Such intermediate components may include both hardware and software based components.

Gate and source PCBs 118 and 116 are connected to the liquid crystal panel 110. The gate and source PCBs 118 and 116 may be connected to the liquid crystal panel 110 through an FPC film. In one embodiment, the gate PCB 118 may supply gate signals to gate lines (not shown) in the liquid crystal panel 110, and the source PCB 116 may supply data signals to data lines (not shown) in the liquid crystal panel 110. The source PCB 116 may be disposed opposite to the source PCB as is shown in the related art.

A top cover 160 is disposed on a front surface of the LCD panel. The top cover 160 has a rectangular frame shape or other shape similar to the main supporter 140. The top cover 160 presses and fixes a peripheral portion of the liquid crystal panel 110 and is combined with the main supporter 140 and the bottom case 150.

The backlight assembly 120 includes a plurality of LEDs 124, a reflecting sheet 126, a light guide plate 130, and optical sheets 132 such as a prism sheet and/or a diffusion sheet. The LEDs 124 may be arranged on a plurality of base PCBs 122. The base PCBs 122 are arranged in parallel on the bottom case 150. The base PCB 122 may contact or be coupled with the bottom case 150. The base PCB 122 may include a MCPCB (metal core printed circuit board) which may effectively absorb and transfer heat produced at the LED 124.

The reflecting sheet 126 has a plurality of through holes 128. The through holes 128 may correspond to the LEDs 124. The light guide plate 130 is spaced apart from the LEDs 124 and has a plurality of reflecting dots 131. The reflecting dots 131 correspond to the LEDs 124 and/or the through holes 128. The optical sheets 132 are disposed on the light guide plate 130. The optical sheets 132 condense and diffuse light passing through the light guide plate 130. The LEDs 124 may include red, green and blue color LEDs of the same number. The red, green and blue color LEDs 124 may turn on substantially simultaneously to mix red, green and blue colors, thereby forming a white color light.

A heat sink 162 is placed at a rear of the bottom case 150, and it has a bent shape. A first part of the heat sink 162 facing the bottom case 150 may overlap and contact the bottom case 150. A second part of the heat sink 162 is bent perpendicularly to the first part. In alternate embodiments, the heat sink 162 may be shaped or bent differently. For example, the bend may not be perpendicular, but may be greater or smaller than 90 degrees.

Figure 4:
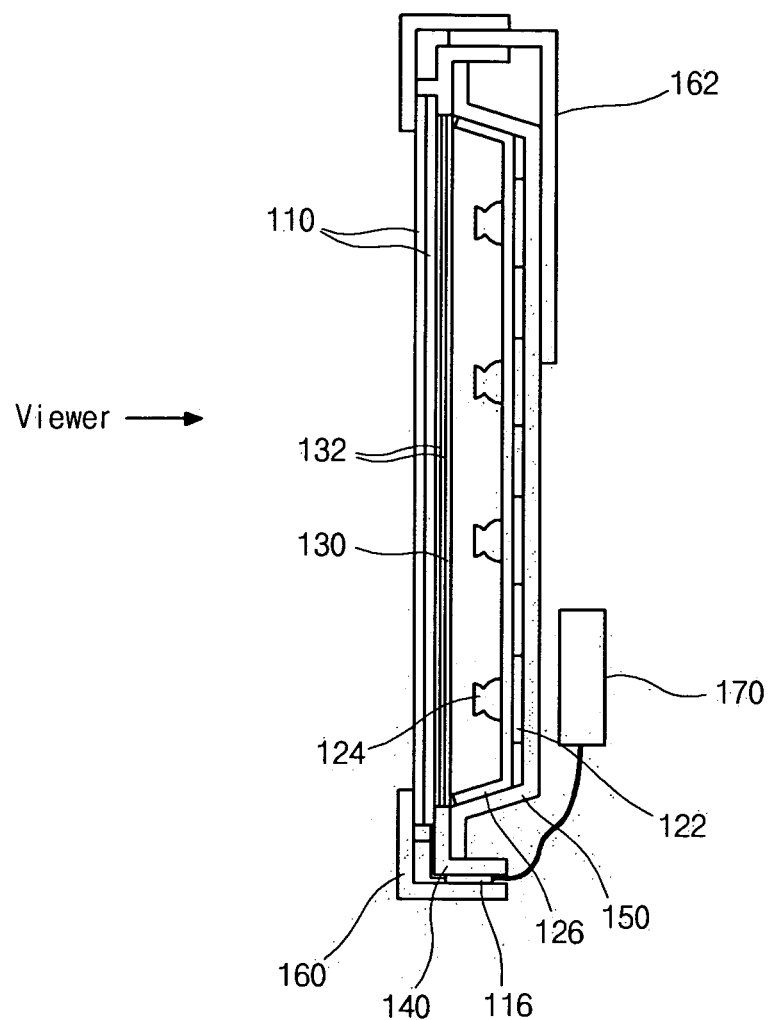
FIG. 4 is a cross-sectional view taken along a line IV-IV of FIG. 3 of an exemplary embodiment.

The heat-irradiating structure of an exemplary embodiment is explained in more detail with reference to both FIGS. 3 and 4 when the LCD device is in a standing state. FIG. 4 is a cross-sectional view taken along a line IV-IV of FIG. 3. The LCD device of FIG. 4 stands substantially vertically to a ground for a viewer's convenience.

Referring to both FIGS. 3 and 4, the base PCB 122 is placed on an inner surface of the bottom case 150, and the LEDs 124 are placed on the base PCB 122. Each of the LEDs 124 protrudes through a through hole (128 of FIG. 3) of a reflection sheet 126. The reflection sheet 126 covers the base PCBs 122 and the bottom case 150. The light guide plate 130 and the optical sheets 132 are disposed over the LEDs 124 and the reflecting sheet 126. The main supporter 140 surrounds or is coupled with the light guide plate 130 and the optical sheets 132. The peripheral portion of the liquid crystal panel 110 is placed on the main supporter 140. The top cover 160 surrounds the liquid crystal panel 110.

With respect to the standing LCD device, the gate PCB (118 of FIG. 3) is disposed on a side portion of the LCD device. The source PCB 116 is disposed on a bottom portion of the LCD device. The source PCB 116 may be disposed between the top cover 160 and the main supporter 140. A control PCB 170 having a timing controller is connected to the source PCB 116. The control PCB 170 generates control signals for the gate PCB and the source PCB 116 and supplies data signals to the source PCB 116. The control PCB 170 is disposed at a lower portion of the standing LCD device. The control PCB 170 may be disposed at the rear of the bottom cover 150.

The driving circuits such as the source PCB 116 and the control PCB 170 are disposed near the lower portion of the standing LCD device. The heat produced by the LEDs 124 may accumulate on the upper portion of the LCD device through thermal convection. The heat produced by the light source of the LCD device may be transferred through thermal convection. In one embodiment, the heat rises within the LCD device, therefore raising the temperature and increasing the heat at an upper portion of the device. Accordingly, the effects on the driving circuit of the heat accumulated may be reduced. In other words, the control PCB 170 may be disposed on a lower portion of the LCD device, which may reduce the heat generated on the upper portion of the LCD device.

The heat sink 162 may be substantially disposed at the upper portion of the standing LCD device. A first part of the heat sink 162 may surround an upper portion of the rear surface of the bottom case 150, and a second part of the heat sink 162 may surround a bent top portion of the bottom case 150. In alternate embodiments, the heat sink 162 may be shaped differently and disposed on a different location on the LCD device. For example, the heat sink 162 may comprise one part that covers an upper portion of the bottom case 150 of the LCD device. Alternatively, the heat sink 162 may comprise more than two parts and be disposed to substantially cover an upper portion of the bottom case 150 of the LCD device. Accordingly, the heat accumulated at the upper portion of the standing LCD device by a thermal convection may be effectively radiated outside through the heat sink 162 disposed on the upper portion of the LCD device. As discussed above, thermal convection may cause the heat to rise to the upper portion of the LCD device, therefore, a heat sink at the upper portion may irradiate that increased heat outside of the device.

The heat sink 162 may include a material having a high thermal conductivity, for example, graphite or aluminum. The high thermal conductivity may allow for the accumulated heat to be effectively radiated outside. The second part of the heat sink 162 may include a copper pipe or an aluminum pipe having a thermal conductivity more than about 2000 of a thermal conductivity of copper. The second part of the heat sink 162 may be combined with or coupled with the first part of the heat sink 162. Accordingly, the heat accumulated can be effectively radiated outside. The second part of the heat sink 162 may have at least one hole or pan.

The base PCB 122 contacts the bottom case 150. The base PCB 122 may include the MCPCB that effectively absorbs the heat produced by the LEDs 124. Accordingly, the heat produced at the LEDs 124 may be transferred to the heat sink 162 through the base PCB 122 and the bottom case 150 and thus irradiated outside.

As described above, the driving circuit is disposed at the lower portion of the standing LCD device where the heat is not substantially accumulated by a thermal convection. The heat sink 162 is disposed at the upper portion of the standing LCD device where the heat is accumulated by a thermal convection. Further, the heat sink 162 may be made of a material or a structure having a high thermal conductivity, and may have a structure or mechanism for irradiating heat outside. Accordingly, the heat accumulated at the upper portion of the LCD device in the standing state may be effectively irradiated outside. Further, the base PCB 122 contacts the bottom case 150, and the heat sink 162 contacts the bottom case 150. Accordingly, the heat produced at the LED can be effectively transferred to the heat sink and irradiated outside.

Further, because the heat is effectively irradiated, the heat sink 162 may have small thickness. Accordingly, a thin heat sink 162 may allow the LCD device to maintain a thin profile.

Figure 5:
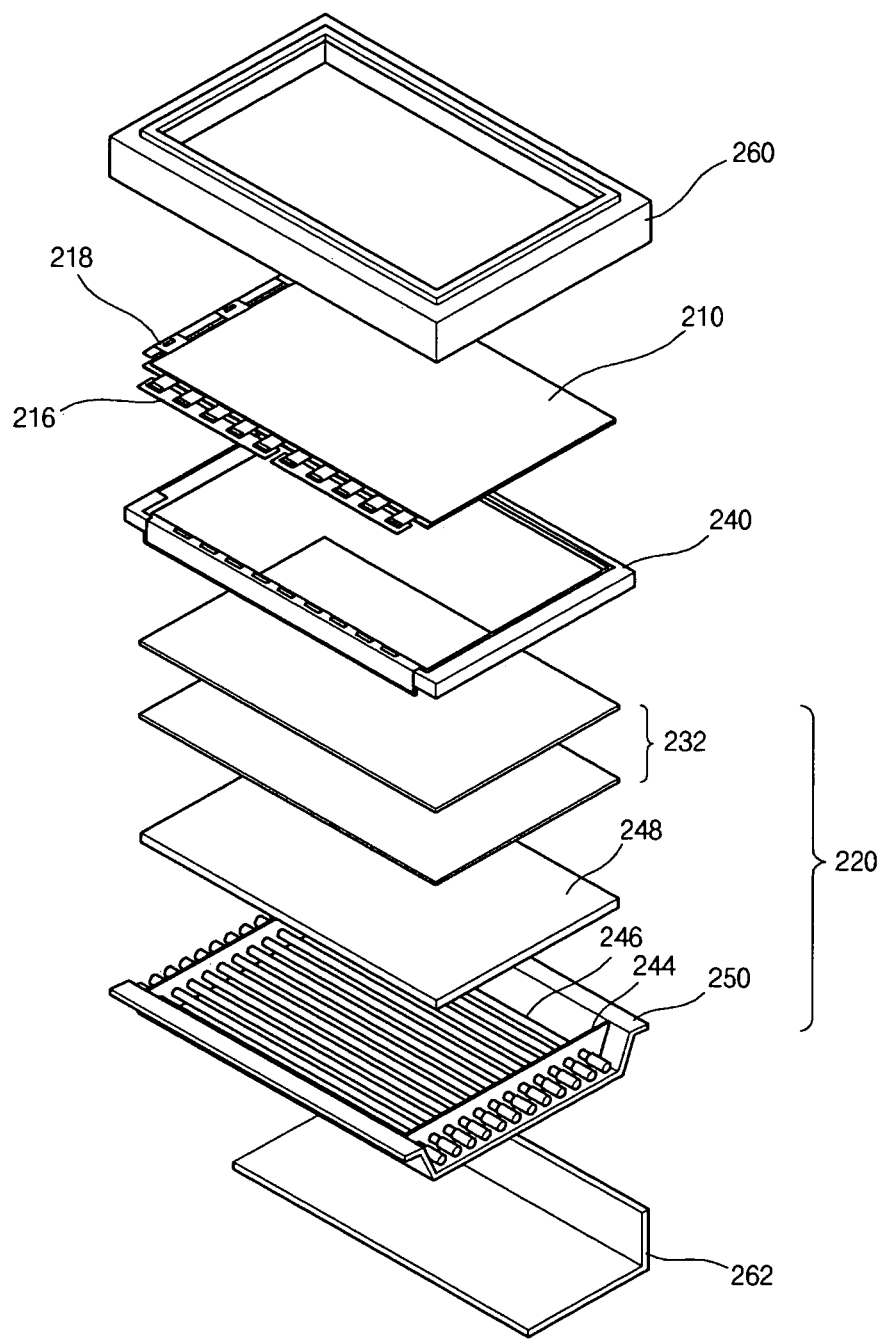
FIG. 5 is an exploded perspective view illustrating an LCD device using a lamp according to another exemplary embodiment.

FIG. 5 is an exploded perspective view illustrating an LCD device using a lamp according to another exemplary embodiment. The LCD device of FIG. 5 is similar to that of FIGS. 3 and 4, except for a different light source. Accordingly, explanations of parts similar with the parts described above in relation to FIGS. 3 and 4 may be omitted.

Referring to FIG. 5, at least one lamp 246 having a bar shape, such as a CCFL or EEFL, may be used as a light source. The at least one lamp 246 is disposed at a rear of a liquid crystal panel 210. The at least one lamp 246 may be arranged in parallel at the rear of the liquid crystal panel 210. A pair of side supporters 244 are disposed at both ends of the lamp 246 and combined with a bottom case 250. The lamps 246 are fixed or supported by the side supporters 244.

In the LCD device according to another exemplary embodiment, a backlight assembly 220 and the liquid crystal panel 210 may be sequentially disposed over an inner surface of a bottom case 250. A main supporter 240 with a rectangular frame shape may support the backlight assembly 220 and the liquid crystal panel 210. The main supporter 240 is combined or coupled with the bottom case 250.

Gate and source PCBs 218 and 216 may be connected to the liquid crystal panel 210. The gate and source PCBs 218 and 216 may be connected to the liquid crystal panel 210 through a FPC film. The source PCB 216 may be disposed opposite to the source PCB as in the related art.

A top cover 260 is disposed on a front surface of the LCD panel. The top cover 260 has a rectangular frame shape in one embodiment. The top cover 260 presses and fixes a peripheral portion of the liquid crystal panel 210 and is combined or coupled with the main supporter 240 and the bottom case 250. The backlight assembly 220 includes the lamp 246, a light guide plate 248, and optical sheets 232 such as a prism sheet and a diffusion sheet. The light guide plate 248 is spaced apart from the lamp 246. The optical sheets 232 are disposed on or coupled with the light guide plate 248. The optical sheets 232 condense and diffuse light passing through the light guide plate 248. The bottom case 250 may function as a reflector.

The heat sink 262 is placed at a rear of the bottom case 250, and has a bent shape. A first part of the heat sink 262 facing the bottom case 250 may overlap and contact the bottom case 250. A second part of the heat sink 262 is bent perpendicularly to the first part.

The heat-irradiating structure of the exemplary embodiment in FIG. 5 is similar to that of the exemplary embodiments described in FIGS. 3 and 4. In other words, the driving circuit is disposed at the lower portion of the standing LCD device where the heat produced at the lamp is not accumulated by a thermal convection. The heat sink 262 is disposed at the upper portion of the standing LCD device where the heat is accumulated by a thermal convection. Further, the heat sink 262 may be made of a material or a structure having a high thermal conductivity, and may have a structure configured to irradiate heat outside. Accordingly, the heat accumulated at the upper portion of the LCD device having the standing state can be effectively irradiated outside. Further, because the heat is effectively irradiated, the heat sink may not be very thick. Accordingly, the LCD device may have a thin profile because the heat sink 262 also has a thin profile.

The exemplary embodiments may be applicable to an LCD device using other types of light sources. The exemplary embodiments are applicable to other display devices where the heat produced is accumulated by thermal convection.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The above disclosed subject matter is to be considered illustrative, and not restrictive, and the appended claims are intended to cover all such modifications, enhancements, and other embodiments, which fall within the true spirit and scope of the present invention. It will be apparent to those skilled in the art that various modifications and variations can be made in the LCD device of the present invention without departing from the spirit or scope of the invention. Thus, it is intended that the present invention cover the modifications and variations of this invention provided they come within the scope of the appended claims and their equivalents.

What is claimed is:

1. A liquid crystal display device comprising:
    a liquid crystal panel;
    a top cover on the liquid crystal panel;
    a bottom case coupled with the liquid crystal panel;
    a backlight assembly coupled with the liquid crystal panel and the bottom case, the backlight assembly including a light source, wherein the bottom case is coupled with the liquid crystal panel and provides a housing for the backlight assembly;
    a main supporter coupled with the bottom case, wherein the main supporter supports the backlight assembly and the liquid crystal panel; and
    a heat sink including a first part and a second part, wherein the first part is disposed on a rear surface of the bottom case, and the second part is disposed on a side portion of the bottom case, and wherein the second part completely covers at least one side portion of the bottom case and is disposed between the at least one side portion of the bottom case and the main supporter.

2. The device according to claim 1, further comprising a driving circuit operating the liquid crystal panel, the driving circuit disposed adjacent to a lower portion of the liquid crystal display device when the liquid crystal display device is in a standing state.

3. The device according to claim 2, wherein the driving circuit includes at least one of a source printed circuit board (PCB) and a control printed circuit board (PCB).

4. The device according to claim 1, wherein the heat sink comprises at least one of graphite or aluminum.

5. The device according to claim 1, wherein the first part of the heat sink comprises at least one of a copper pipe or an aluminum pipe.

6. The device according to claim 1, wherein the light source comprises at least one light emitting diode (LED).

7. The device according to claim 6, further comprising a base printed circuit board (PCB) on which the at least one LED is placed, the base PCB contacting the bottom case.

8. The device according to claim 1, wherein the light source comprises at least one lamp.

9. The device according to claim 2, wherein
    the heat sink is configured to irradiate heat produced at the light source, and wherein the heat is irradiated outside the liquid crystal display device.

10. The device according to claim 9, wherein the first part surrounds an upper portion of the rear surface of the bottom case, and the second part surrounds a top portion of the bottom case when the liquid crystal display device is in a standing state.

11. The device according to claim 9, wherein the second part is coupled with the rear surface of the bottom case.

12. The device according to claim 2, wherein
    the heat sink is disposed under the liquid crystal display device where heat produced at the light source is accumulated by a thermal convection, and
    wherein the driving circuit is disposed on the liquid crystal display device at a position different from where the heat is accumulated and the heat sink is disposed.

13. The device according to claim 1,
    wherein the heat sink is coupled with a top portion of the bottom case and an upper portion of the rear surface of the bottom case when the liquid crystal display device is in a standing state.

14. The device according to claim 2,
    wherein the heat sink is disposed on a top area of the bottom case and an upper portion of the rear surface of the bottom case where thermal convection causes an accumulation of heat when the liquid crystal display device is in a standing state and
    wherein the driving circuit is disposed on an area of the bottom case opposite from the heat sink.

15. The device according to claim 1, wherein the second part is bent perpendicularly to the first part.

16. The device according to claim 1, wherein the second part is disposed between the side portion of the bottom case and the top cover.

17. The device according to claim 1, wherein the second part is a plate shape.

\* \* \* \* \*